(12) United States Patent
Miller (10) Patent No.: US 12,177,106 B2
(45) Date of Patent: Dec. 24, 2024

(54) SYSTEMS AND METHODS FOR TESTING OPERATIONS FOR DISTRIBUTED DEVICE SYSTEMS

(71) Applicant: CORNING RESEARCH & DEVELOPMENT CORPORATION, Corning, NY (US)

(72) Inventor: Yishay Miller, Elad (IS)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 582 days.

(21) Appl. No.: 17/497,608

(22) Filed: Oct. 8, 2021

(65) Prior Publication Data
US 2022/0131783 A1   Apr. 28, 2022

Related U.S. Application Data

(60) Provisional application No. 63/094,990, filed on Oct. 22, 2020.

(51) Int. Cl.
*H04L 43/02*   (2022.01)
*H04L 43/50*   (2022.01)
*H04B 10/2575*   (2013.01)

(52) U.S. Cl.
CPC ........ *H04L 43/50* (2013.01); *H04B 10/25752* (2013.01)

(58) Field of Classification Search
CPC .............. H04B 10/25752; H04L 12/56; H04L 41/0654; H04L 41/0677; H04L 43/00; H04L 43/02; H04L 43/08; H04L 43/0811; H04L 43/0817; H04L 43/20; H04L 43/50; H04L 2012/5628; H04L 2012/5646
See application file for complete search history.

(56) References Cited

U.S. PATENT DOCUMENTS

| | | | | |
|---|---|---|---|---|
| 2013/0071112 | A1* | 3/2013 | Melester | H04B 1/006 455/67.14 |
| 2013/0308693 | A1* | 11/2013 | Li | H04W 24/02 375/224 |
| 2017/0054496 | A1* | 2/2017 | Hazani | H04B 10/25753 |
| 2018/0131417 | A1* | 5/2018 | Daniel | H04L 5/14 |
| 2019/0268255 | A1* | 8/2019 | Kazav | H04L 67/10 |

FOREIGN PATENT DOCUMENTS

EP   3242421 A1   11/2017

* cited by examiner

*Primary Examiner* — Frank Duong
(74) *Attorney, Agent, or Firm* — William D. Doyle (57) ABSTRACT

Systems and methods for testing operations for distributed device systems may use a test signal that is generated at a central unit and looped back internally within the central unit to test the central unit. The test signal may then be sent over a communication medium to a remote unit and looped back to the central unit to test the communication path. Further, the remote unit may include a testing circuit to test internally. By sequentially testing devices within the distributed device system, problems may be isolated and potentially repaired without having to return a device to a manufacturer facility. Even when such returns are needed, only the problematic device is returned, potentially saving time in the installation.

10 Claims, 9 Drawing Sheets

SYSTEMS AND METHODS FOR TESTING OPERATIONS FOR DISTRIBUTED DEVICE SYSTEMS

CROSS-REFERENCE TO RELATED APPLICATIONS

This application claims the benefit of priority under 35 U.S.C. § 119 of U.S. Provisional Application Ser. No. 63/094,990, filed Oct. 22, 2020, the content of which is relied upon and incorporated herein by reference in its entirety.

BACKGROUND

The technology of the disclosure relates to a self-test system and process in distributed device systems such as a distributed communication system (DCS).

Distributed device systems such as a DCS involve the cooperation of devices which are rarely co-located. For example, in a DCS, a central unit may send signals to and receive signals from remote units while concurrently communicating with external networks. Repeaters, intermediate power units, and other devices may also be interconnected within the DCS. Cables must be connected properly; cables and wiring must be installed correctly; and each device must be functional for the system to operate correctly. A faulty motherboard, a severed cable, an improperly inserted connector, or the like may cause the system, or at least a portion of the system, to be inoperative.

In many instances, the installation technician may not have a tool set that allows for problem isolation. Such technician may have to uninstall multiple devices and return to a manufacturer facility for testing and problem isolation. In some instances, if a replacement is not readily available for the installation, such returns may delay the installation by days or even weeks.

No admission is made that any reference cited herein constitutes prior art. Applicant expressly reserves the right to challenge the accuracy and pertinency of any cited documents.

SUMMARY

Embodiments disclosed herein include systems and methods for testing operations for distributed device systems. In exemplary aspects, a test signal is generated at a central unit and looped back internally within the central unit to test the central unit. The test signal may then be sent over a communication medium to a remote unit and looped back to the central unit to test the communication path. Further, the remote unit may include a testing circuit to test internally. By sequentially testing devices within the distributed device system, problems may be isolated and potentially repaired without having to return a device to a manufacturer facility. Even when such returns are needed, only the problematic device is returned, potentially saving time in the installation.

In this regard, in one embodiment, a communication unit is disclosed. The communication unit comprises an interface configured to be coupled to a communication medium for communication to a remote unit. The communication unit also comprises an operational mode circuit configured to process operational signals sent and received through the interface. The communication unit also comprises a testing circuit comprising a test signal generator circuit and a test signal checker circuit. The communication unit also comprises a switch coupled to the operational mode circuit and the testing circuit and configured to switch between test signals and the operational signals. The communication unit also comprises a control circuit operatively coupled to the switch and the testing circuit. The control circuit is configured to cause the testing circuit to generate a test signal. The control circuit is also configured to cause the switch to select the test signals received from the testing circuit. The control circuit is also configured to send the test signal to a circuit to be tested. The control circuit is also configured to receive a return signal at the testing circuit from the circuit to be tested. The testing circuit is configured to detect an error based on the test signal checker circuit.

In another embodiment, a method of testing a distributed device system is disclosed. The method comprises generating a test signal at a testing circuit. The method also comprises sending the test signal through at least one circuit to be tested. The method also comprises looping the test signal back to the testing circuit as a return signal from the at least one circuit to be tested. The method also comprises checking the return signal against the test signal for errors.

In another embodiment, a distributed communication system (DCS) is disclosed. The DCS comprises a central unit. The central unit is configured to distribute received one or more downlink communications signals over one or more downlink communications links to one or more remote units. The central unit is also configured to distribute received one or more uplink communications signals from the one or more remote units from one or more uplink communications links. The DCS also comprises a plurality of remote units. Each remote unit among the plurality of remote units is configured to distribute the received one or more downlink communications signals received from the one or more downlink communications links to one or more client devices. Each remote unit is also configured to distribute the received one or more uplink communications signals from the one or more client devices to the one or more uplink communications links. The DCS also comprises a testing circuit comprising a test signal generator circuit and a test signal checker circuit. The testing circuit configured to generate a test signal to be sent through a circuit to be tested and receive a return signal to be compared to the test signal by the test signal checker circuit.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include systems and methods for testing operations for distributed device systems. In exemplary aspects, a test signal is generated at a central unit and looped back internally within the central unit to test the central unit. The test signal may then be sent over a communication medium to a remote unit and looped back to the central unit to test the communication path. Further, the remote unit may include a testing circuit to test internally. By sequentially testing devices within the distributed device system, problems may be isolated and potentially repaired without having to return a device to a manufacturer facility. Even when such returns are needed, only the problematic device is returned, potentially saving time in the installation.

Figure 1:
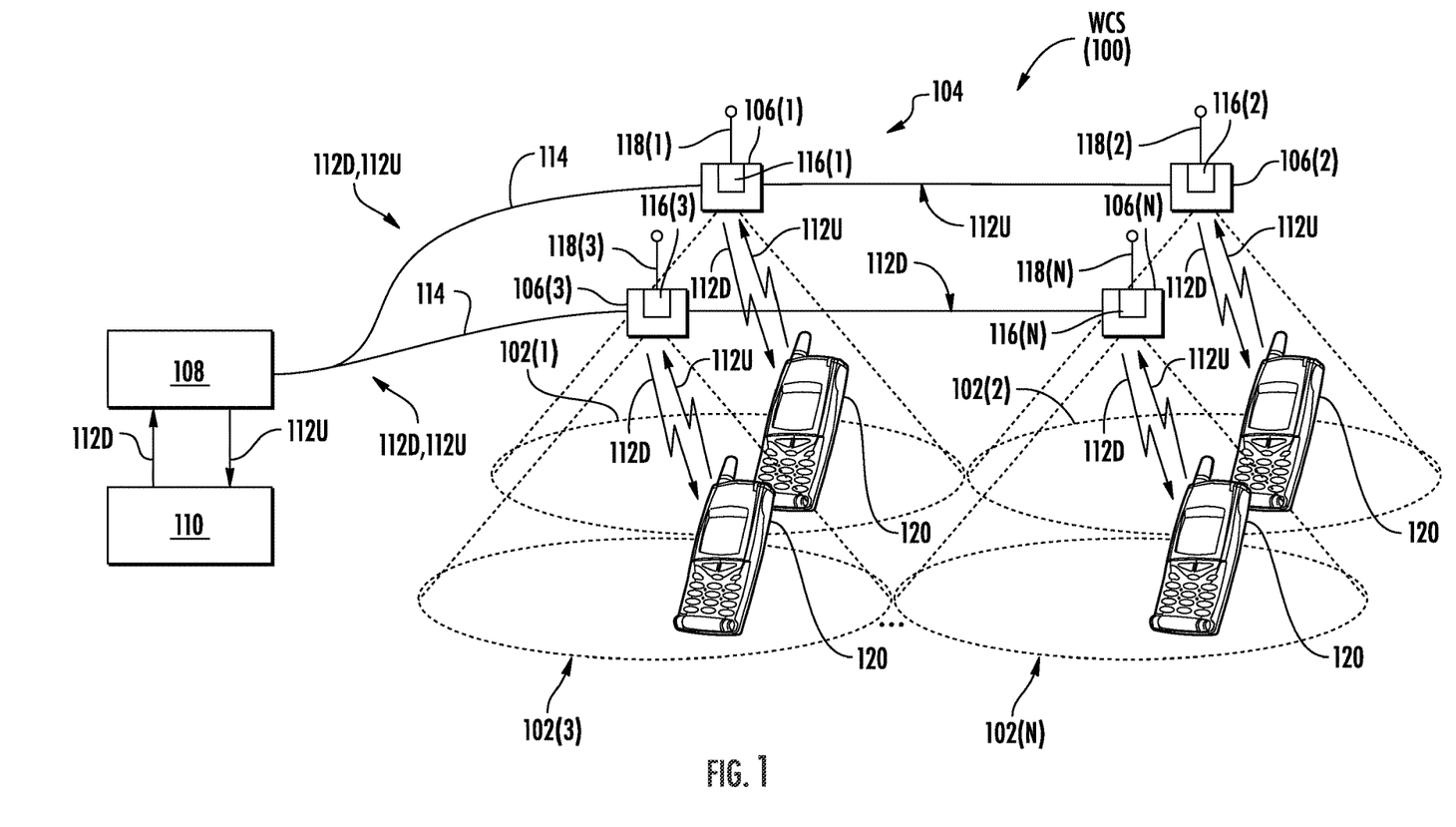
FIG. 1 is a schematic diagram of an exemplary optical fiber-based distributed communication system (DCS) configured to distribute communications signals between a central unit and a plurality of remote units that may benefit from a testing solution as described herein.
Figure 2:
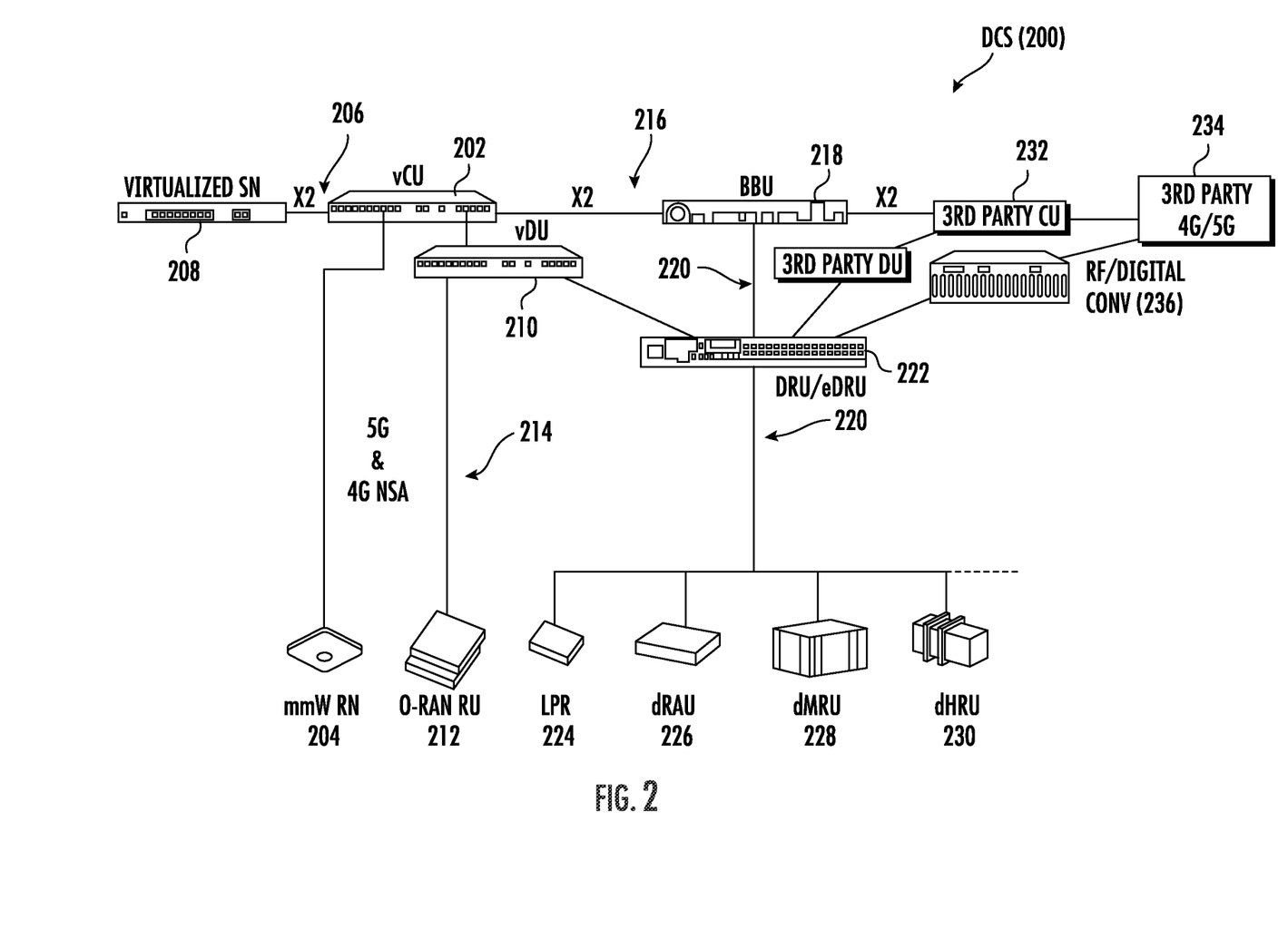
FIG. 2 is a schematic diagram of an exemplary DCS that supports 4G and 5G communications services, through the use of distributed router units (DRUs) and the like that may benefit from a testing solution as described herein.

Before addressing particular aspects of the systems for testing operations and the associated methods, an exploration of a few distributed device systems is provided with reference to FIGS. 1 and 2. A discussion of the operation testing circuitry begins below with reference to FIG. 3 where operation testing circuitry is provided in a central unit.

In this regard, FIG. 1 illustrates a wireless communication system (WCS) 100, such as a distributed communication system (DCS), that is configured to distribute communications services to remote coverage areas 102(1)-102(N), where 'N' is the number of remote coverage areas. The WCS 100 in FIG. 1 is provided in the form of a wireless DCS, such as a distributed antenna system (DAS) 104. The DAS 104 can be configured to support a variety of communications services that can include cellular communications services, wireless communications services, such as radio frequency (RF) identification (RFID) tracking, Wi-Fi, local area network (LAN), and wireless LAN (WLAN), wireless solutions (Bluetooth, Wi-Fi Global Positioning System (GPS) signal-based, and others) for location-based services, and combinations thereof, as examples. The remote coverage areas 102(1)-102(N) are created by and centered on remote units 106(1)-106(N) (sometimes also called remote units in that they are a sub-component of the WCS 100) connected to a central unit 108 (e.g., a head-end controller, a central unit, or a head-end unit). The central unit 108 may be communicatively coupled to a source transceiver 110, such as for example, a base transceiver station (BTS) or a baseband unit (BBU). In this regard, the central unit 108 receives downlink communications signals 112D from the source transceiver 110 to be distributed to the remote units 106(1)-106(N). The downlink communications signals 112D can include data communications signals and/or communication signaling signals, as examples. The central unit 108 is configured with filtering circuits and/or other signal processing circuits that are configured to support a specific number of communications services in a particular frequency bandwidth (i.e., frequency communications bands). The downlink communications signals 112D are communicated by the central unit 108 over a communications link 114 over their frequency to the remote units 106(1)-106(N).

With continuing reference to FIG. 1, the remote units 106(1)-106(N) are configured to receive the downlink communications signals 112D from the central unit 108 over the communications link 114. The downlink communications signals 112D are configured to be distributed to the respective remote coverage areas 102(1)-102(N) of the remote units 106(1)-106(N). The remote units 106(1)-106(N) are also configured with filters and other signal processing circuits that are configured to support all or a subset of the specific communications services (i.e., frequency communications bands) supported by the central unit 108. In a non-limiting example, the communications link 114 may be a wired communications link, a wireless communications link, or an optical fiber-based communications link. Each of the remote units 106(1)-106(N) may include an RF transmitter/receiver 116(1)-116(N) and a respective antenna 118(1)-118(N) operably connected to the RF transmitter/receiver 116(1)-116(N) to distribute wirelessly the communications services to user equipment (UE) 120 within the respective remote coverage areas 102(1)-102(N). The remote units 106(1)-106(N) are also configured to receive uplink communications signals 112U from the UE 120 in the respective remote coverage areas 102(1)-102(N) to be distributed to the source transceiver 110.

Because the remote units 106(1)-106(N) include components that require power to operate, such as the RF transmitters/receivers 116(1)-116(N) for example, it is necessary to provide power to the remote units 106(1)-106(N). In one example, each remote unit 106(1)-106(N) may receive power from a local power source. In another example, the remote units 106(1)-106(N) may be powered remotely from a remote power source(s). For example, the central unit 108 in the WCS 100 in FIG. 1 may include a power source (not shown) that is configured to remotely supply power over the communications links 114 to the remote units 106(1)-106

(N). For example, the communications links 114 may be cable that includes electrical conductors for carrying current (e.g., direct current (DC)) to the remote units 106(1)-106(N).

If the WCS 100 is an optical fiber-based DCS, the central unit 108 can be coupled to the remote units 106(1)-106(N) via an optical communications network, such as a passive optical network (PON). In this regard, the communications links 114 may by a "hybrid" cable that includes optical fibers for carrying the downlink and uplink communications signals 112D, 112U and separate electrical conductors for carrying power to the remote units 106(1)-106(N).

Exemplary aspects of the present disclosure allow testing to see if devices such as the central unit 108 or the remote units 106(1)-106(N) are operational to assist installation personnel in determining if and where problems may exist.

FIG. 2 is a schematic diagram illustrating exemplary DCSs 200 that supports 4G and 5G communications services. The DCSs 200 support both legacy 4G LTE, 4G/5G non-standalone (NSA), and 5G communications systems. As shown in FIG. 2, a centralized services node 202 (also referred to herein as a central unit) is provided that is configured to interface with a core network to exchange communications data and distribute the communications data as radio signals to remote units. In this example, the centralized services node 202 is configured to support distributed communications services to a millimeter wave (mmW) radio node (RN) 204. The functions of the centralized services node 202 can be virtualized through an x2 interface 206 to another services node (SN) 208. The centralized services node 202 can also include one or more internal radio nodes that are configured to be interfaced with a distribution node 210 to distribute communications signals for the radio nodes to an open RAN (O-RAN) remote unit 212 that is configured to be communicatively coupled through an O-RAN interface 214.

The centralized services node 202 can also be interfaced through an x2 interface 216 to a BBU 218 that can provide a digital signal source to the centralized services node 202. The BBU 218 is configured to provide a signal source to the centralized services node 202 to provide radio source signals 220 to the O-RAN remote unit 212 as well as to a distributed router unit (DRU) 222 as part of a digital DAS. The DRU 222 is configured to split and distribute the radio source signals 220 to different types of remote units, including a lower-power remote unit (LPR) 224, a radio antenna unit (dRAU) 226, a mid-power remote unit (dMRU) 228, and a high-power remote unit (dHRU) 230. The BBU 218 is also configured to interface with a third party central unit 232 and/or an analog source 234 through an RF/digital converter 236. While not shown in FIG. 2, it should be appreciated that the DCS 200 may comply with the common public radio interface (CPRI) standard and may include CPRI circuitry therein.

As with the WCS 100, the DCS 200 may include one or more devices that may be tested for operational functionality according to the testing systems and methods of the present disclosure. In particular, software, circuitry, power connections, fibers, other communication media, or the like may all be tested.

Figure 3:
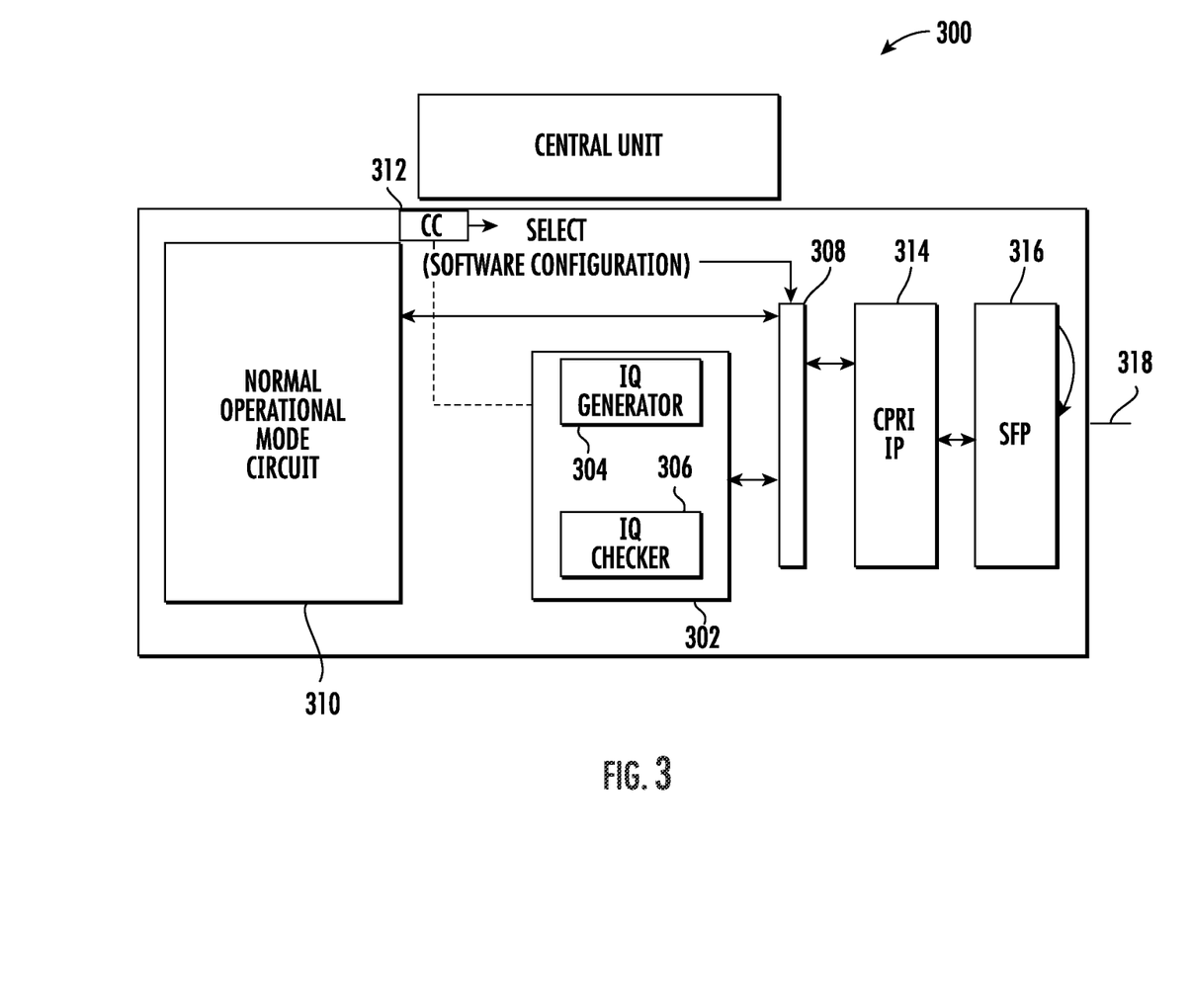
FIG. 3 is a block diagram of an exemplary central unit in a DCS with a self-test circuit for testing operations according to exemplary aspects of the present disclosure.

Specifically, a central unit 300, which may be the central unit 108 or the centralized services node 202, is illustrated in FIG. 3 with a testing circuit 302 disposed therein to effectuate testing according to exemplary aspects of the present disclosure. The testing circuit 302 may include an IQ generator circuit 304 (generically a test signal generator circuit) and an IQ checker circuit 306 (generically a test signal checker circuit). The IQ generator circuit 304 is configured to create an IQ signal having a known sequence or pattern. The IQ checker circuit 306 is configured to check a return or feedback signal against the known sequence or pattern and may include a counter (not shown) that increments for every bit of the feedback signal that does not match the known sequence or pattern. The testing circuit 302 may be coupled to a multiplexer or switch 308. The switch 308 selects between normal operational signals from a normal operational mode circuit 310 (e.g., a baseband processor, an RF transceiver configured to interoperate with the BTS 110, and the like so as to process ordinary (i.e., non-test) signals that are sent and received through the central unit 300) and signals from the testing circuit 302. A control circuit (CC) 312 may, based on a software configuration, send a select signal that controls the switch 308. The switch 308 is coupled to a CPRI intellectual property (IP) module or circuit 314, which in turn may be coupled to a small form-factor pluggable (SFP) circuit 316, which in turn may be coupled to a communication medium 318, such as an optical fiber or the like. It should be appreciated that one or more of the elements of the central unit 300 may be formed from a field programmable gate array (FPGA) circuit and multiple elements may be within a single FPGA or each element may be its own FPGA.

To test operational functionality of the central unit 300, the control circuit 312 causes the switch 308 to select the testing circuit 302. Further, the control circuit 312 causes the testing circuit 302 to generate a test signal using the IQ generator circuit 304. The switch 308 passes the test signal to the CPRI IP circuit 314, which passes the signal to the SFP circuit 316. The test signal is then routed back as a feedback signal to the testing circuit 302 through the CPRI IP circuit 314 and the switch 308. Note for the purposes of the present disclosure, failure to receive any signal is defined to be receipt of a feedback signal and the IQ checker circuit 306 may treat each non-received bit as an error. In an exemplary aspect, routing back may be achieved through a jumper that the testing personnel applies for the purpose of the test. Alternatively, a multiplexer or switch (not shown) may cause the signal to return without leaving the central unit 300. The IQ checker circuit 306 within the testing circuit 302 compares the feedback signal with the known sent signal and determines if the feedback signal is different (e.g., corrupted) from the test signal. If the signal does not return, then there may be a malfunction within the central unit 300 and the unit may be replaced with a new unit while the replaced unit is returned to the manufacturer for further testing. If the signal returns, but is corrupted, then there may be a malfunction within the central unit 300 that may be similarly addressed. If the signal returns and is correct, then the central unit 300 has passed the test and further testing may be performed for remote units within a distributed device system.

Note further that while the above description contemplates that the control circuit 312 initiates and conducts the test by controlling the switch 308 and the testing circuit 302, such operation may be controlled by the installation technician through an external device coupled to the central unit 300. Exemplary ways to initiate the test may be through a command line interface (CLI) command, an embedded software function, or the like.

While testing the central unit 300 is a step in the process, there are other devices to be tested. A process 400 illustrated in FIG. 4 outlines one exemplary method for testing the central unit 300 as well as other devices. In this regard, the process 400 begins when the basic installation is complete (block 402) (e.g., the devices are mounted in desired locations, cabling and power are all connected, etc.). The technician may then then access a control panel or use an external device that is communicatively coupled to the control circuit 312 and use software to test the CPRI IP circuit 314 and the SFP circuit 316 of the central unit 300 (block 404). If the central unit 300 passes the test, then the technician may cause the testing circuit 302 to send a known signal to a downstream DRU (e.g., DRU 222 or 500 (explained below with reference to FIG. 5)) to test the DRU link (e.g., the fibers or communication media between the central unit 300 and the DRU 500) and the DRU circuitry (block 406). If the central unit 300 fails the test, the technician may skip to block 410 described below. In an exemplary aspect, a failure is indicated by the counter of the IQ checker circuit 306 exceeding a threshold. In an exemplary aspect, that threshold is zero, but non-zero values are also contemplated. In another exemplary aspect, the threshold may be set to a certain number of errors per amount of data or a certain number of errors within a specific time period.

Figure 4:
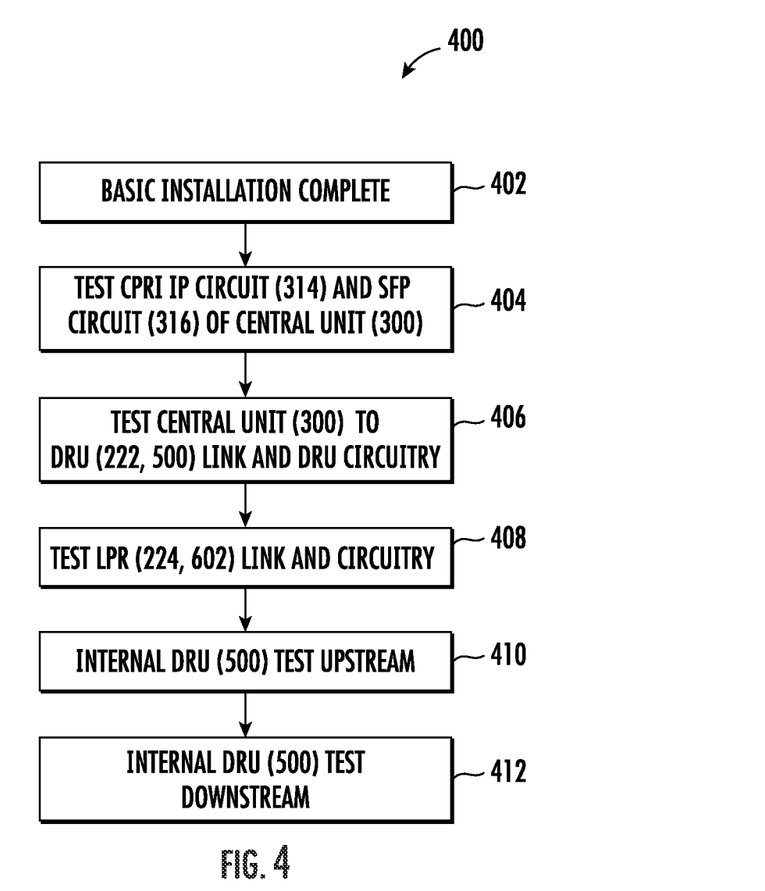
FIG. 4 is a flowchart illustrating exemplary methods for testing operations on a central unit according to exemplary aspects of the present disclosure.
Figure 6:
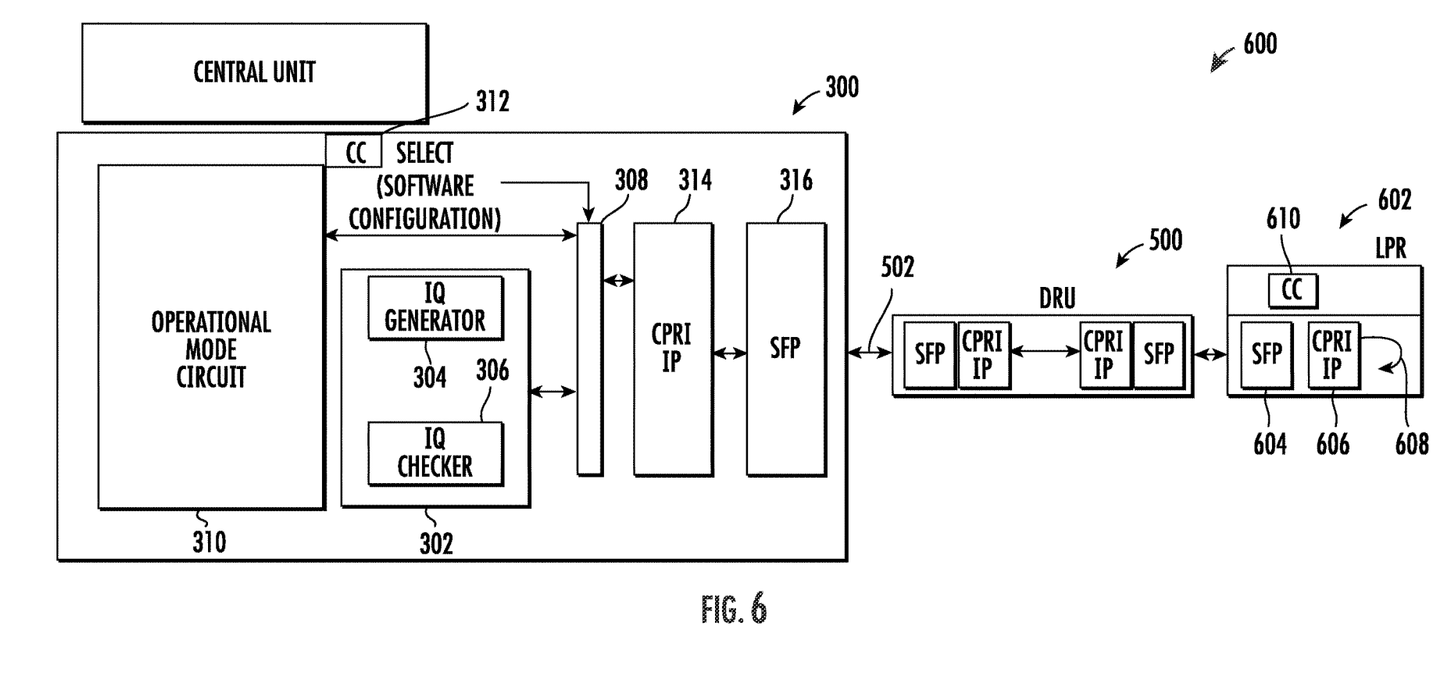
FIG. 6 is a block diagram of a central unit connected to a remote unit through an intermediate remote unit that includes a self-test circuit for testing operations according to exemplary aspects of the present disclosure.

With continued reference to FIG. 4, the process 400 continues to test LPR (e.g. 224 or 602 (described below with reference to FIG. 6)) to test the DRU-LPR link and the LPR circuitry (block 408). If the testing shows that there is a failure downstream of the central unit 300, i.e., in the DRU 500 or the LPR 602, then the process 400 may further test the internal circuitry of the DRU 500. Specifically, the DRU 500 may conduct an internal test for the upstream circuitry (block 410) (e.g., facing the central unit 300) and then conduct an internal test for the downstream circuitry (block 412) (e.g., facing the LPR 602). If the circuitry of the DRU 500 passes the test, then the fault may be in the connections or in the LPR 602. Based on the testing results, appropriate hardware may be replaced and returned to the manufacturer for repair or the like. However, unlike prior installation procedures, the problematic hardware may be isolated in situ and thereby allow for immediate rectification.

Figure 5:
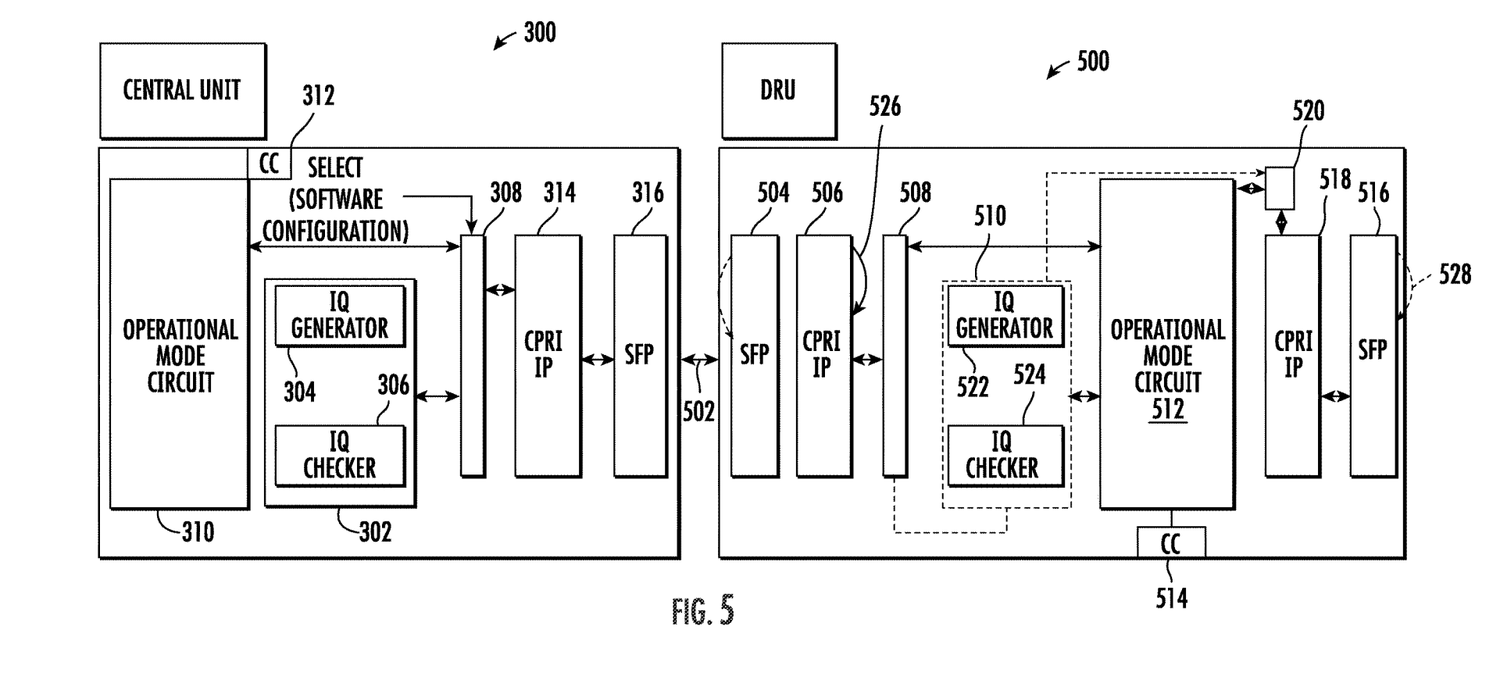
FIG. 5 is a block diagram of a central unit connected to a remote unit that includes a self-test circuit for testing operations according to exemplary aspects of the present disclosure.

To further assist in the operational testing of the present disclosure, additional modifications may be made to a DRU, such as DRU 500 illustrated in FIG. 5. The DRU 500 may be coupled to the central unit 300 by a communication link 502. The DRU 500 may include an upstream (or central unit facing) SFP circuit 504, an upstream (or central unit facing) CPRI IP circuit 506. A switch 508 may select between a signal from a testing circuit 510 and an operational mode circuit 512 based on input from a control circuit 514. Similarly, the DRU 500 may include a downstream (or LPR facing) SFP circuit 516, a downstream (or LPR facing) CPRI IP circuit 518. A switch 520 may select between a signal from the testing circuit 510 and the operational mode circuit 512 based on input from the control circuit 514.

To test operational functionality of the DRU 500, the control circuit 514 may initially test the upstream side such as by causing the switch 508 to select the testing circuit 510. Further, the control circuit 514 causes the testing circuit 510 to generate a test signal using an IQ generator circuit 522. The switch 508 passes the test signal to the CPRI IP circuit 506, which passes the signal to the SFP circuit 504. The signal is then routed back to the testing circuit 510 through the CPRI IP circuit 506 and the switch 508. In an exemplary aspect, routing back may be achieved through a jumper that the testing personnel applies for the purpose of the test. Alternatively, a multiplexer or switch (not shown) may cause the signal to return without leaving the DRU 500. An IQ checker circuit 524 within the testing circuit 510 compares the received signal with the known sent signal and determines if the signal has, in fact been returned, and if so, has the signal been corrupted or is the signal the same. If the signal does not return, then there may be a malfunction within the DRU 500 and the unit may be replaced with a new unit while the replaced unit is returned to the manufacturer for further testing. If the signal returns, but is corrupted, then there may be a malfunction within the DRU 500 that may be similarly addressed. If the signal returns and is correct, then the DRU 500 has passed the test. Further testing on the downstream side and/or other remote units may be performed.

It should be appreciated that the CPRI IP circuit 506 may include a loopback circuit 526 that allows signals from the central unit 300 to be looped back through the communication link 502 to handle the testing of block 406. Alternatively or in addition, there may be a loopback circuit 528 associated with the downstream SFP circuit 516 that causes signals from the central unit 300 to be looped back to the central unit 300. It should be appreciated that the loopback circuits 526, 528 could be invoked sequentially to help the central unit 300 isolate a fault if desired.

To finish testing the operational functionality of the DRU 500, the control circuit 514 may also test the downstream side such as by causing the switch 520 to select the testing circuit 510. Further, the control circuit 514 causes the testing circuit 510 to generate a test signal using the IQ generator circuit 522. The switch 520 passes the test signal to the CPRI IP circuit 518, which passes the signal to the SFP circuit 516. The signal is then routed back to the testing circuit 510 through the CPRI IP circuit 518 and the switch 520. In an exemplary aspect, routing back may be achieved through the loopback circuit 528 or a jumper that the testing personnel applies for the purpose of the test. Alternatively, a multiplexer or switch (not shown) may cause the signal to return without leaving the DRU 500. The IQ checker circuit 524 within the testing circuit 510 compares the received signal with the known sent signal and determines if the signal has, in fact been returned, and if so, has the signal been corrupted or is the signal the same. If the signal does not return, then there may be a malfunction within the DRU 500 and the unit may be replaced with a new unit while the replaced unit is returned to the manufacturer for further testing. If the signal returns, but is corrupted, then there may be a malfunction within the DRU 500 that may be similarly addressed. If the signal returns and is correct, then the DRU 500 has passed the test.

It should further be appreciated that a single transmit-receive path may also be tested if both the central unit 300 and the DRU 500 have respective testing circuits. That is, instead of looping back, the DRU 500 may receive the signal from the central unit 300 and use the testing circuit 510 (and particularly, the IQ checker circuit 524) to check the received signal against the known test signal. Again, errors may be counted. Likewise, the DRU 500, and specifically the IQ generator circuit 522 may generate a test signal and send it to the central unit 300. The IQ checker circuit 306 may then use the received signal as a feedback signal to compare to the known test signal. Isolation of a specific transmit-receive path may assist in isolating where exactly a problem may be occurring.

The DRU 500 may be connected to further downstream devices such as an LPR. A system 600 showing a central unit 300 connected to a DRU 500 connected to an LPR 602 is provided in FIG. 6. The LPR 602 may include an SFP circuit 604 as well as a CPRI IP circuit 606. When a test signal arrives at the LPR 602, a loopback circuit 608 may cause the test signal to be returned to the testing circuit that generated the test signal (e.g., testing circuit 302 or 510). A control circuit 610 may be instructed to activate the loopback circuit 608 or a technician may manually activate the loopback circuit 608 (e.g., such as by applying a jumper or otherwise causing the signal to be returned). While an LPR is specifically contemplated and illustrated, it should be appreciated that a high-power remote unit may also be downstream of the DRU 500 without departing from the present disclosure. The processes outlined herein are generic as to a low-power or high-power remote unit.

It should be appreciated that distributed device systems may be installed in a variety of locations, configurations and topologies. Exemplary aspects of the testing methods described herein may be modified as needed to optimize testing for such different configurations. For example, the LPR could be tested before the central unit or the LPR may include the testing circuitry and tests originate in the LPR. Likewise, loopback functionality may be achieved through a variety of mechanisms without departing from the present disclosure. Still further, as discussed above, the testing of the present disclosure may be initiated through a variety of mechanisms including a control panel activating the control circuit, a tablet, or external device that couples via wires or wirelessly to the control circuit or the like.

Figure 7:
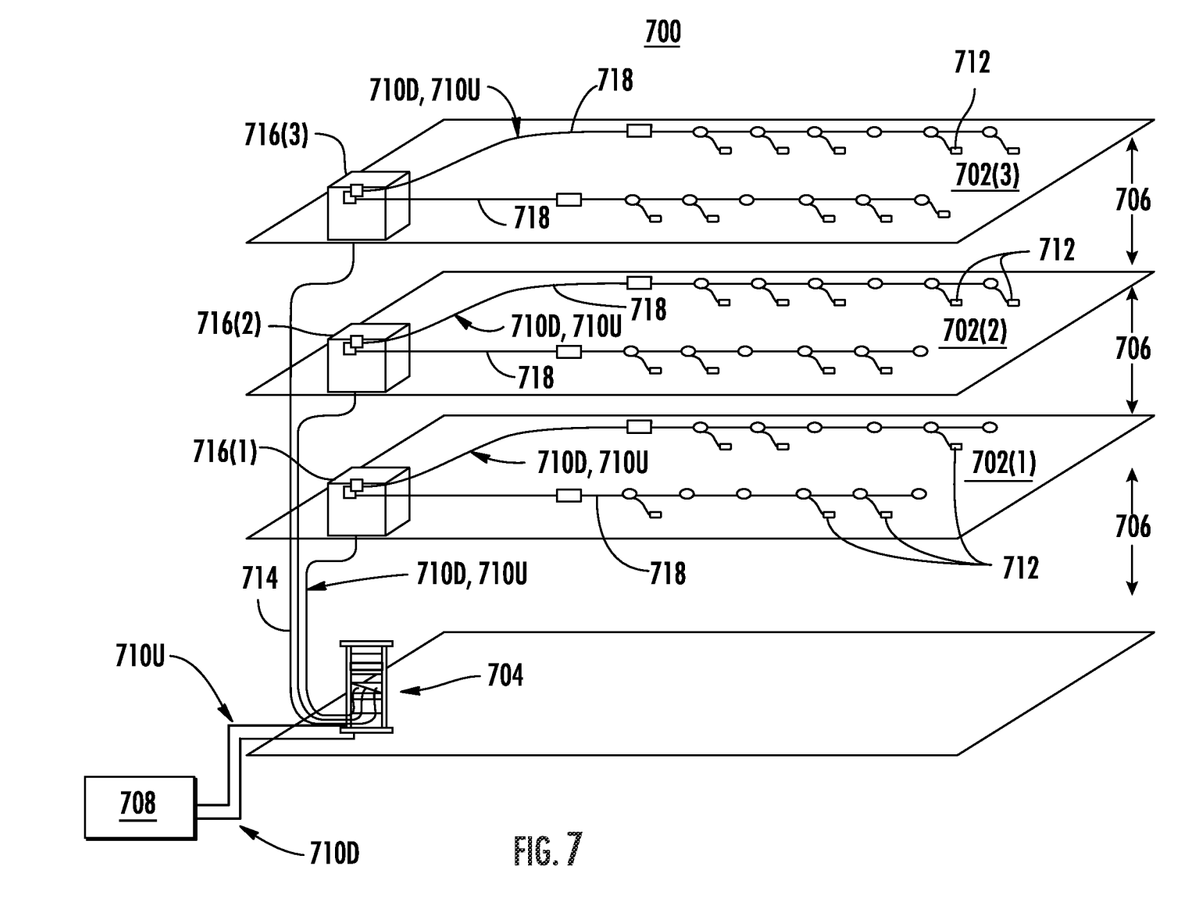
FIG. 7 is a partially schematic cut-away diagram of an exemplary building infrastructure in which the DCS in FIG. 1 can be provided
Figure 8:
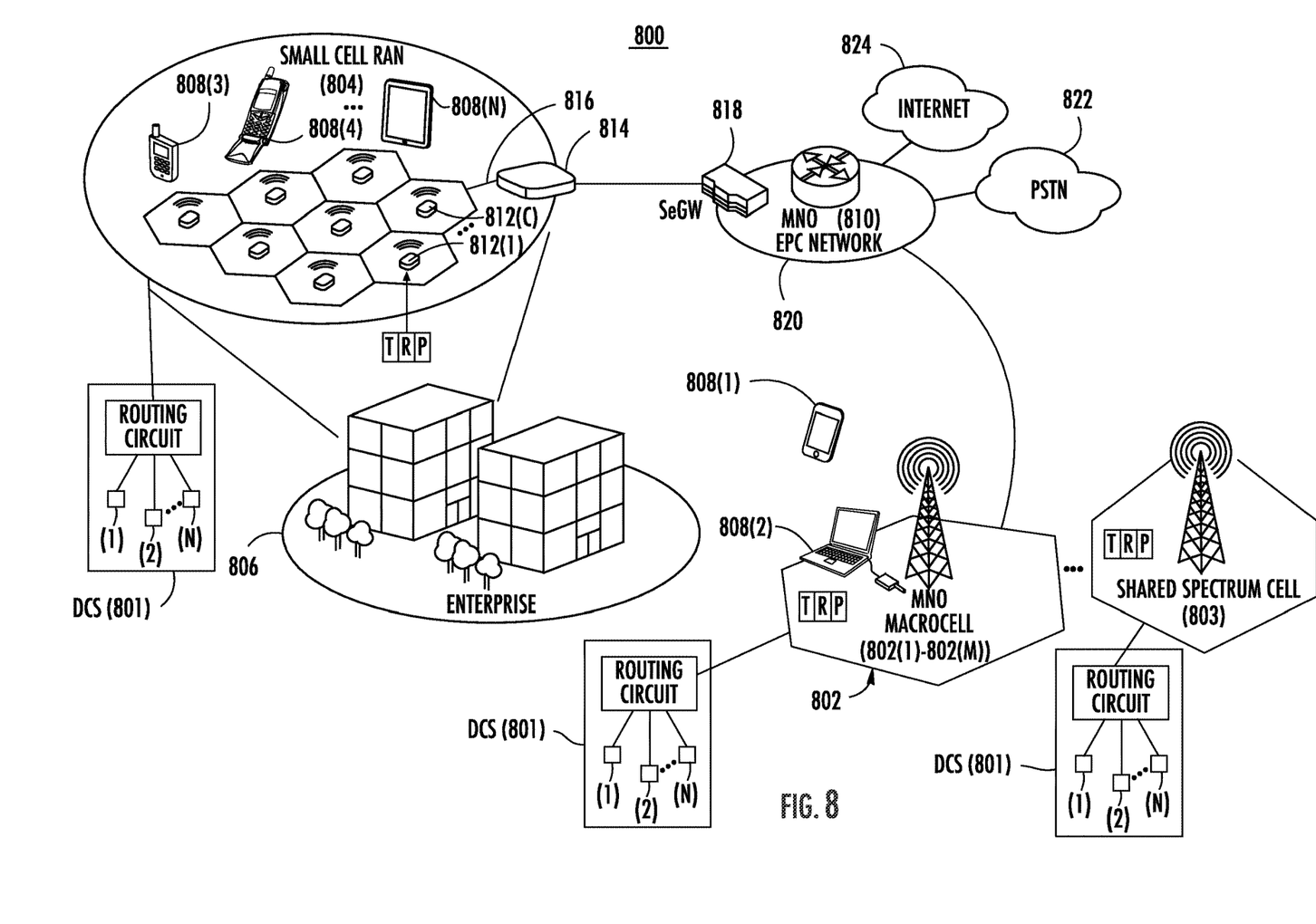
FIG. 8 is a schematic diagram of an exemplary mobile telecommunications environment that includes an exemplary radio access network (RAN) that includes a mobile network operator (MNO) macrocell employing a radio node, a shared spectrum cell employing a radio node, and an exemplary small cell RAN employing a multi-operator radio node located within an enterprise environment as DCSs.

By way of example of different configurations, two possible DCSs are further illustrated in FIGS. 7, 8. The DCS of FIG. 1 or 2 can be provided in an indoor environment as illustrated in FIG. 7. FIG. 7 is a partial schematic cut-away diagram of an exemplary building infrastructure 700 having a DCS therein. The building infrastructure 700 in this embodiment includes a first (ground) floor 702(1), a second floor 702(2), and a third floor 702(3). The floors 702(1)-702(3) are serviced by a central unit 704 to provide antenna coverage areas 706 in the building infrastructure 700. The central unit 704 is communicatively coupled to a base station 708 to receive downlink communications signals 710D from the base station 708. The central unit 704 is communicatively coupled to a plurality of remote units 712 to distribute the downlink communications signals 710D to the remote units 712 and to receive uplink communications signals 710U from the remote units 712, as previously discussed above. The downlink communications signals 710D and the uplink communications signals 710U communicated between the central unit 704 and the remote units 712 are carried over a riser cable 714. The riser cable 714 may be routed through interconnect units (ICUs) 716(1)-716(3) dedicated to each of the floors 702(1)-702(3) that route the downlink communications signals 710D and the uplink communications signals 710U to the remote units 712 and also provide power to the remote units 712 via array cables 718.

By way of further example of a DCS, FIG. 8 is a schematic diagram of an exemplary mobile telecommunications environment 800 (also referred to as "environment 800") that includes radio nodes and cells that may support shared spectrum, such as unlicensed spectrum, and can be interfaced to shared spectrum DCSs 801 supporting coordination of distribution of shared spectrum from multiple service providers to remote units to be distributed to subscriber devices.

The environment 800 includes exemplary macrocell RANs 802(1)-802(M) ("macrocells 802(1)-802(M)") and an exemplary small cell RAN 804 located within an enterprise environment 806 and configured to service mobile communications between user mobile communications devices 808(1)-808(N) to a mobile network operator (MNO) 810. A serving RAN for the user mobile communications devices 808(1)-808(N) is a RAN or cell in the RAN in which the user mobile communications devices 808(1)-808(N) have an established communications session with the exchange of mobile communications signals for mobile communications. Thus, a serving RAN may also be referred to herein as a serving cell. For example, the user mobile communications devices 808(3)-808(N) in FIG. 8 are being serviced by the small cell RAN 804, whereas user mobile communications devices 808(1) and 808(2) are being serviced by the macrocell 802. The macrocell 802 is an MNO macrocell in this example. However, a shared spectrum RAN 803 (also referred to as "shared spectrum cell 803") includes a macrocell in this example and supports communications on frequencies that are not solely licensed to a particular MNO, such as CBRS for example, and thus may service user mobile communications devices 808(1)-808(N) independent of a particular MNO. For example, the shared spectrum cell 803 may be operated by a third party that is not an MNO and wherein the shared spectrum cell 803 supports CBRS. Also, as shown in FIG. 8, the MNO macrocell 802, the shared spectrum cell 803, and/or the small cell RAN 804 can interface with a shared spectrum DCS 801 supporting coordination of distribution of shared spectrum from multiple service providers to remote units to be distributed to subscriber devices. The MNO macrocell 802, the shared spectrum cell 803, and the small cell RAN 804 may be neighboring radio access systems to each other, meaning that some or all can be in proximity to each other such that the user mobile communications devices 808(3)-808(N) may be able to be in communications range of two or more of the MNO macrocell 802, the shared spectrum cell 803, and the small cell RAN 804 depending on the location of user mobile communications devices 808(3)-808(N).

In FIG. 8, the mobile telecommunications environment 800 in this example is arranged as a Long Term Evolution (LTE) system as described by the Third Generation Partnership Project (3GPP) as an evolution of the GSM/UMTS standards (Global System for Mobile communication/Universal Mobile Telecommunications System). It is emphasized, however, that the aspects described herein may also be applicable to other network types and protocols. The mobile telecommunications environment 800 includes the enterprise environment 806 in which the small cell RAN 804 is implemented. The small cell RAN 804 includes a plurality of small cell radio nodes 812(1)-812(C). Each small cell radio node 812(1)-812(C) has a radio coverage area (graphically depicted in the drawings as a hexagonal shape) that is commonly termed a "small cell." A small cell may also be referred to as a femtocell or, using terminology defined by 3GPP, as a Home Evolved Node B (HeNB). In the description that follows, the term "cell" typically means the combination of a radio node and its radio coverage area unless otherwise indicated.

In FIG. 8, the small cell RAN 804 includes one or more services nodes (represented as a single services node 814) that manage and control the small cell radio nodes 812(1)-812(C). In alternative implementations, the management and control functionality may be incorporated into a radio node, distributed among nodes, or implemented remotely (i.e., using infrastructure external to the small cell RAN 804). The small cell radio nodes 812(1)-812(C) are coupled to the services node 814 over a direct or local area network (LAN) connection 816 as an example, typically using secure IPsec tunnels. The small cell radio nodes 812(1)-812(C) can include multi-operator radio nodes. The services node 814 aggregates voice and data traffic from the small cell radio nodes 812(1)-812(C) and provides connectivity over an IPsec tunnel to a security gateway (SeGW) 818 in a network 820 (e.g., evolved packet core (EPC) network in a 4G network, or 5G Core in a 5G network) of the MNO 810. The network 820 is typically configured to communicate with a public switched telephone network (PSTN) 822 to carry circuit-switched traffic, as well as for communicating with an external packet-switched network such as the Internet 824.

The environment 800 also generally includes a node (e.g., eNodeB or gNodeB) base station, or "macrocell" 802. The radio coverage area of the macrocell 802 is typically much larger than that of a small cell where the extent of coverage often depends on the base station configuration and surrounding geography. Thus, a given user mobile communications device 808(3)-808(N) may achieve connectivity to the network 820 (e.g., EPC network in a 4G network, or 5G Core in a 5G network) through either a macrocell 802 or small cell radio node 812(1)-812(C) in the small cell RAN 804 in the environment 800.

Figure 9:
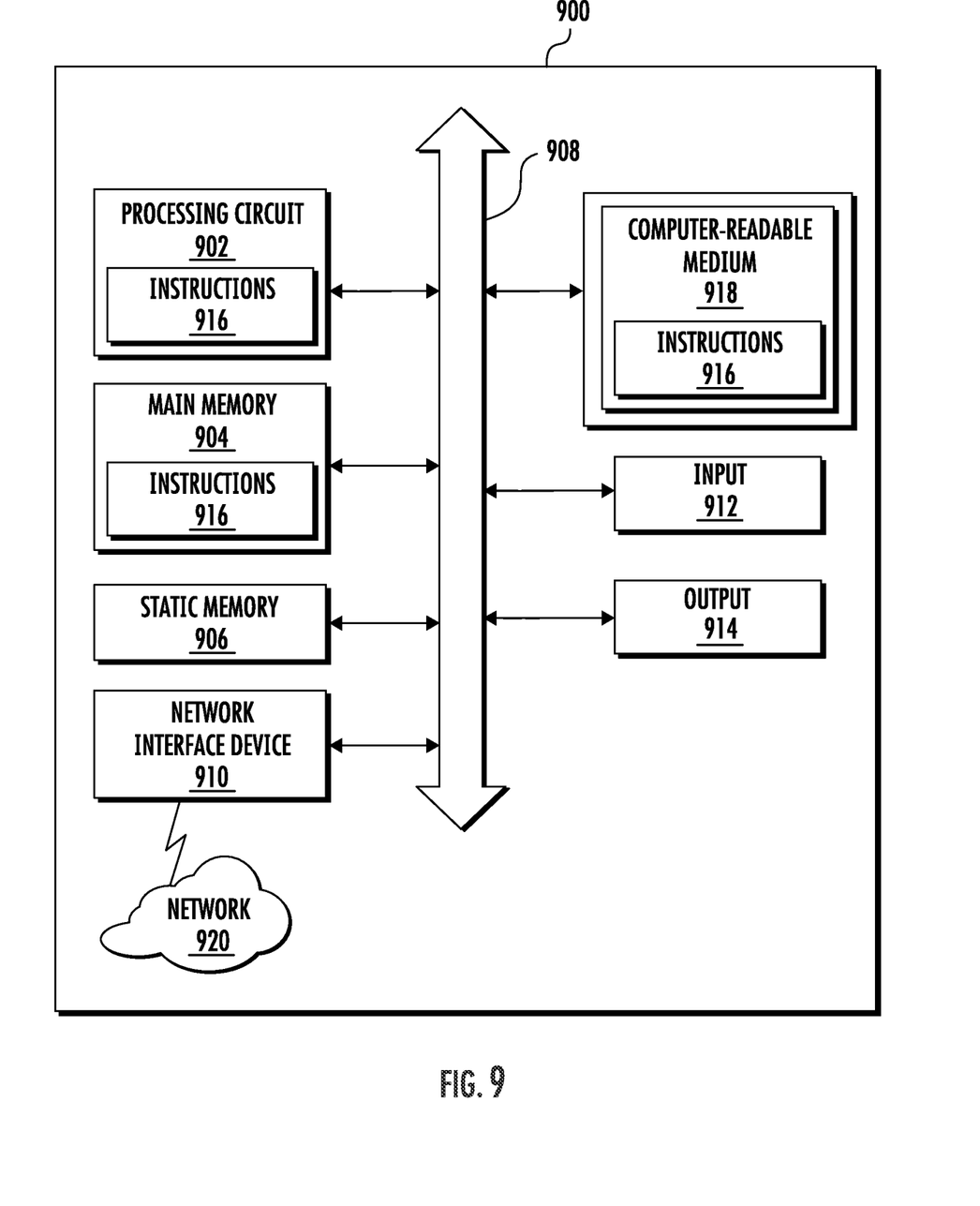
FIG. 9 is a schematic diagram of a generalized representation of an exemplary controller that can be included in any component or circuit in a DCS, wherein an exemplary computer system is adapted to execute instructions from an exemplary computer-readable link.

FIG. 9 is a schematic diagram representation of additional detail illustrating a computer system 900 that could be employed in any component or circuit in a DCS such as the DCS illustrated in FIG. 1, 2, 7, or 8. In this regard, the computer system 900 is adapted to execute instructions from an exemplary computer-readable medium to perform these and/or any of the functions or processing described herein. The computer system 900 in FIG. 9 may include a set of instructions that may be executed to program and configure programmable digital signal processing circuits in a DCS for supporting scaling of supported communications services. The computer system 900 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 900 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 900 in this embodiment includes a processing circuit or processor 902, a main memory 904 (e.g., read-only memory (ROM), flash memory, dynamic random access memory (DRAM), such as synchronous DRAM (SDRAM), etc.), and a static memory 906 (e.g., flash memory, static random access memory (SRAM), etc.), which may communicate with each other via a data bus 908. Alternatively, the processor 902 may be connected to the main memory 904 and/or static memory 906 directly or via some other connectivity means. The processor 902 may be a controller, and the main memory 904 or static memory 906 may be any type of memory.

The processor 902 represents one or more general-purpose processing devices, such as a microprocessor, central processing unit, or the like. More particularly, the processor 902 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 902 is configured to execute processing logic in instructions for performing the operations and steps discussed herein.

The computer system 900 may further include a network interface device 910. The computer system 900 also may or may not include an input 912, configured to receive input and selections to be communicated to the computer system 900 when executing instructions. The computer system 900 also may or may not include an output 914, including, but not limited to, a display, a video display unit (e.g., a liquid crystal display (LCD) or a cathode ray tube (CRT)), an alphanumeric input device (e.g., a keyboard), and/or a cursor control device (e.g., a mouse).

The computer system 900 may or may not include a data storage device that includes instructions 916 stored in a computer-readable medium 918. The instructions 916 may also reside, completely or at least partially, within the main memory 904 and/or within the processor 902 during execution thereof by the computer system 900, the main memory 904 and the processor 902 also constituting computer-readable medium. The instructions 916 may further be transmitted or received over a network 920 via the network interface device 910.

While the computer-readable medium 918 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.), a machine-readable transmission medium (electrical, optical, acoustical or other form of propagated signals (e.g., carrier waves, infrared signals, digital signals, etc.)), etc.

Unless specifically stated otherwise as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art would further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information may be represented using any of a variety of different technologies and techniques. For example, data, instructions, commands, information, bits, symbols, and chips that may be referenced throughout the above description may be represented by voltages, currents, electromagnetic waves, magnetic fields or particles, optical fields or particles, or any combination thereof.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163, the disclosures of which are incorporated herein by reference in their entireties.

Many modifications and other embodiments of the embodiments set forth herein will come to mind to one skilled in the art to which the embodiments pertain having the benefit of the teachings presented in the foregoing descriptions and the associated drawings. For example, the antenna arrangements may include any type of antenna desired, including, but not limited to, dipole, monopole, and slot antennas. The distributed antenna systems that employ the antenna arrangements disclosed herein could include any type or number of communications mediums, including, but not limited to, electrical conductors, optical fiber, and air (i.e., wireless transmission). The distributed antenna systems may distribute and the antenna arrangements disclosed herein may be configured to transmit and receive any type of communications signals, including, but not limited to, RF communications signals and digital data communications signals, examples of which are described in U.S. patent application Ser. No. 12/892,424 entitled "Providing Digital Data Services in Optical Fiber-based Distributed Radio Frequency (RF) Communications Systems, And Related Components and Methods," published as U.S. Patent Application Publication No. 2011/0268446, incorporated herein by reference in its entirety. Multiplexing, such as WDM and/or FDM, may be employed in any of the distributed antenna systems described herein, such as according to the examples provided in U.S. patent application Ser. No. 12/892,424.

Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A communication unit comprising:
an interface configured to be coupled to a communication medium for communication to a remote unit;
an operational mode circuit configured to process operational signals sent and received through the interface;
a testing circuit comprising a test signal generator circuit and a test signal checker circuit;
a switch coupled to the operational mode circuit and the testing circuit and configured to switch between test signals and the operational signals; and
a control circuit operatively coupled to the switch and the testing circuit, the control circuit configured to:
cause the testing circuit to generate a test signal;
cause the switch to select the test signal received from the testing circuit;
send the test signal to a circuit to be tested; and
receive a return signal at the testing circuit from the circuit to be tested;
wherein the testing circuit is configured to detect an error based on the test signal checker circuit.

2. The communication unit of claim 1, wherein the communication unit comprises a central unit and the circuit to be tested is within the central unit.

3. The communication unit of claim 1, wherein the communication unit comprises a central unit and the circuit to be tested is in the remote unit.

4. The communication unit of claim 1, wherein the circuit to be tested comprises a common public radio interface (CPRI) intellectual property (IP) circuit.

5. The communication unit of claim 1, wherein the circuit to be tested comprises a simple form-factor pluggable (SFP) circuit.

6. The communication unit of claim 1 integrated into a distributed router unit (DRU).

7. The communication unit of claim 6, wherein the circuit to be tested comprises a downstream-facing common public radio interface (CPRI) intellectual property (IP) (CPRI IP) circuit.

8. The communication unit of claim 6, wherein the circuit to be tested comprises an upstream-facing common public radio interface (CPRI) intellectual property (IP) (CPRI IP) circuit.

9. The communication unit of claim 1, further comprising a jumper configured to route the test signal back to the testing circuit.

10. The communication unit of claim 1 integrated into a central unit of a distributed antenna system (DAS).

* * * * *